United States Patent
Nakagawa et al.

(10) Patent No.: US 9,418,619 B2
(45) Date of Patent: Aug. 16, 2016

(54) IMAGE DISPLAY DEVICE

(75) Inventors: Shinji Nakagawa, Osaka (JP);
Hidekazu Miyata, Osaka (JP);
Hiroyuki Furukawa, Osaka (JP);
Kazuyoshi Yoshiyama, Osaka (JP);
Yasuhiro Yoshida, Osaka (JP);
Toshihiro Yanagi, Osaka (JP);
Taketoshi Nakano, Osaka (JP); Asahi Yamato, Osaka (JP); Ken Inada, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 105 days.

(21) Appl. No.: 14/127,521

(22) PCT Filed: Jun. 20, 2012

(86) PCT No.: PCT/JP2012/065729
§ 371 (c)(1),
(2), (4) Date: Dec. 19, 2013

(87) PCT Pub. No.: WO2012/176800
PCT Pub. Date: Dec. 27, 2012

(65) Prior Publication Data
US 2014/0104301 A1    Apr. 17, 2014

(30) Foreign Application Priority Data
Jun. 22, 2011    (JP) .................................. 2011-138744

(51) Int. Cl.
*G09G 5/02* (2006.01)
*G09G 3/20* (2006.01)
(Continued)

(52) U.S. Cl.
CPC ............ *G09G 5/02* (2013.01); *G02F 1/133514* (2013.01); *G09G 3/2003* (2013.01); *G09G 3/3607* (2013.01); *G02F 2201/52* (2013.01); *G09G 2300/0452* (2013.01);
(Continued)

(58) Field of Classification Search
None
See application file for complete search history.

(56) References Cited

U.S. PATENT DOCUMENTS

2004/0174389 A1*  9/2004  Ben-David et al. ........... 345/694
2007/0152997 A1   7/2007  Lee
(Continued)

FOREIGN PATENT DOCUMENTS

JP    2006-154414 A    6/2006
JP    2006-276797 A    10/2006
(Continued)

OTHER PUBLICATIONS

Official Communication issued in International Patent Application No. PCT/JP2012/065729, mailed on Jul. 24, 2012.

*Primary Examiner* — Phi Hoang
(74) *Attorney, Agent, or Firm* — Keating & Bennett, LLP

(57) ABSTRACT

There is provided an image display device, in which a pixel includes sub-pixels of four or more colors that include a color in addition to the three primary colors, and which can display a high-quality image in which false colors or artifacts are suppressed. The image display device includes a pixel area in which a plurality of pixels P are arranged in a matrix shape, and each of the pixels P includes m (m is an integer which is equal to or greater than 4) sub-pixels SP. When it is assumed that the colors of the m sub-pixels SP included in one pixel are C1, C2, ..., and Cm, the m sub-pixels SP which are sequentially arrayed from an arbitrary position include all of the colors of C1, C2, ..., and Cm in both the vertical direction and the horizontal direction in the pixel area.

19 Claims, 21 Drawing Sheets

(51) Int. Cl.
*G09G 3/36* (2006.01)
*G02F 1/1335* (2006.01)

(52) U.S. Cl.
CPC .............. *G09G 2320/0242* (2013.01); *G09G 2340/0457* (2013.01); *G09G 2360/16* (2013.01)

(56) References Cited

U.S. PATENT DOCUMENTS

2007/0268208 A1  11/2007  Okada et al.
2009/0153652 A1  6/2009  Barenbrug
2010/0033405 A1* 2/2010  Aragaki et al. ................ 345/55

FOREIGN PATENT DOCUMENTS

| | | |
|---|---|---|
| JP | 2007-139838 A | 6/2007 |
| JP | 2007-183611 A | 7/2007 |
| JP | 2008-089631 A | 4/2008 |
| JP | 2009-519625 A | 5/2009 |
| JP | 2010-010112 A | 1/2010 |
| WO | 2006/018926 A1 | 2/2006 |

* cited by examiner

FIG. 1

|   | P1 | | P2 | PG P3 | | | SP | |
|---|---|---|---|---|---|---|---|---|
|   | A | b | C | d | A | b | C | d |
|   | d | C | b | A | d | C | b | A |
| P4 | C | d | A | b | C | d | A | b |
|   | b | A | d | C | b | A | d | C |
|   | A | b | C | d | A | b | C | d |
|   | d | C | b | A | d | C | b | A |
|   | C | d | A | b | C | d | A | b |
|   | b | A | d | C | b | A | d | C |

FIG. 2

| A | b | C | d | A | b | C | d |
|---|---|---|---|---|---|---|---|
| d | C | b | A | d | C | b | A |
| C | d | A | b | C | d | A | b |
| b | A | d | C | b | A | d | C |
| A | b | C | d | A | b | C | d |
| d | C | b | A | d | C | b | A |
| C | d | A | b | C | d | A | b |
| b | A | d | C | b | A | d | C |

FIG. 5

| A | b | C | d | A | b | C | d |
|---|---|---|---|---|---|---|---|
| d | C | b | A | d | C | b | A |
| C | d | A | b | C | d | A | b |
| b | A | d | C | b | A | d | C |
| A | b | C | d | A | b | C | d |
| d | C | b | A | d | C | b | A |
| C | d | A | b | C | d | A | b |
| b | A | d | C | b | A | d | C |

| A |  | C |  | A |  | C |  |
|---|---|---|---|---|---|---|---|
| d |  | b |  | d |  | b |  |
| C |  | A |  | C |  | A |  |
| b |  | d |  | b |  | d |  |
| A |  | C |  | A |  | C |  |
| d |  | b |  | d |  | b |  |
| C |  | A |  | C |  | A |  |
| b |  | d |  | b |  | d |  |

FIG. 6

| A | b | A | b | A | b | A | b |
|---|---|---|---|---|---|---|---|
| d | C | d | C | d | C | d | C |
| A | b | A | b | A | b | A | b |
| d | C | d | C | d | C | d | C |
| A | b | A | b | A | b | A | b |
| d | C | d | C | d | C | d | C |
| A | b | A | b | A | b | A | b |
| d | C | d | C | d | C | d | C |

| A | ▨ | A | ▨ | A | ▨ | A | ▨ |
|---|---|---|---|---|---|---|---|
| d | ▨ | d | ▨ | d | ▨ | d | ▨ |
| A | ▨ | A | ▨ | A | ▨ | A | ▨ |
| d | ▨ | d | ▨ | d | ▨ | d | ▨ |
| A | ▨ | A | ▨ | A | ▨ | A | ▨ |
| d | ▨ | d | ▨ | d | ▨ | d | ▨ |
| A | ▨ | A | ▨ | A | ▨ | A | ▨ |
| d | ▨ | d | ▨ | d | ▨ | d | ▨ |

FIG. 12

| A | b | C | d | A | b | C | d |
|---|---|---|---|---|---|---|---|
| d | C | b | A | d | C | b | A |
| C | d | A | b | C | d | A | b |
| b | A | d | C | b | A | d | C |
| A | b | C | d | A | b | C | d |
| d | C | b | A | d | C | b | A |
| C | d | A | b | C | d | A | b |
| b | A | d | C | b | A | d | C |

FIG. 13

| A | b | A | b | A | b | A | b |
|---|---|---|---|---|---|---|---|
| d | C | d | C | d | C | d | C |
| A | b | A | b | A | b | A | b |
| d | C | d | C | d | C | d | C |
| A | b | A | b | A | b | A | b |
| d | C | d | C | d | C | d | C |
| A | b | A | b | A | b | A | b |
| d | C | d | C | d | C | d | C |

| A | b | C | d | A | b | C | d |
|---|---|---|---|---|---|---|---|
| d | C | b | A | d | C | b | A |
| C | d | A | b | C | d | A | b |
| b | A | d | C | b | A | d | C |
| A | b | C | d | A | b | C | d |
| d | C | b | A | d | C | b | A |
| C | d | A | b | C | d | A | b |
| b | A | d | C | b | A | d | C |

| A | b | C | d | E | f |
|---|---|---|---|---|---|
| d | E | f | A | b | C |
| C | d | E | f | A | b |
| f | A | b | C | d | E |
| E | f | A | b | C | d |
| b | C | d | E | f | A |

| A |  | C |  | E |  |
|---|---|---|---|---|---|
| d |  | f |  | b |  |
| C |  | E |  | A |  |
| f |  | b |  | d |  |
| E |  | A |  | C |  |
| b |  | d |  | f |  |

FIG. 22

| A | b | C | A | b | C |
|---|---|---|---|---|---|
| d | E | f | d | E | f |
| A | b | C | A | b | C |
| d | E | f | d | E | f |
| A | b | C | A | b | C |
| d | E | f | d | E | f |

| A | ▨ | C | ▨ | b | ▨ |
|---|---|---|---|---|---|
| d | ▨ | f | ▨ | E | ▨ |
| A | ▨ | C | ▨ | b | ▨ |
| d | ▨ | f | ▨ | E | ▨ |
| A | ▨ | C | ▨ | b | ▨ |
| d | ▨ | f | ▨ | E | ▨ |

FIG. 23

| A | b | C | d | E | f |
|---|---|---|---|---|---|
| d | E | f | A | b | C |
| f | A | b | C | d | E |
| C | d | E | f | A | b |
| E | f | A | b | C | d |
| b | C | d | E | f | A |

FIG. 24

| A | d | C | f | E | b |
|---|---|---|---|---|---|
| b | E | d | A | f | C |
| C | f | E | b | A | d |
| d | A | f | C | b | E |
| E | b | A | d | C | f |
| f | C | b | E | d | A |

FIG. 25

| A | d | f | C | E | b |
|---|---|---|---|---|---|
| b | E | A | d | f | C |
| C | f | b | E | A | d |
| d | A | C | f | b | E |
| E | b | d | A | C | f |
| f | C | E | b | d | A |

IMAGE DISPLAY DEVICE

TECHNICAL FIELD

The present invention relates to an image display device, and, in particular, to an image display device in which one pixel includes sub-pixels of four or more colors that include at least one color in addition to the three primary colors.

BACKGROUND ART

To date, a color image display device, in which one pixel includes three sub-pixels that display red (R), green (G) and blue (B), that is, the three primary colors of light, has been widely used. In addition, recently, in order to enable the colors of various objects (the colors of various objects which exist in nature) to be displayed by increasing the range of colors that can be displayed (color reproduction range), a method of increasing the number of colors of sub-pixels has been proposed.

For example, International Publication WO. 2006/018926 discloses a so-called multi-primary color image display device in which sub-pixels include a color in addition to the three primary colors of RGB. In the image display device, one pixel includes a total of four or more sub-pixels which include a sub-pixel of at least one color of cyan (Cy), magenta (Mg), and yellow (Ye) in addition to the three primary colors of RGB.

In the multi-primary color image display device according to the related art, it is possible to reproduce the colors of various objects by increasing the number of colors of the sub-pixels as described above. However, depending on the arrangement of the sub-pixels, there is a problem in that false colors or artifacts (images which are not present in an original image) are generated when an input image which includes, in particular, a high frequency signal is displayed.

SUMMARY OF INVENTION

The present invention has been made to solve the above problem, and the present invention discloses an image display device in which a pixel includes sub-pixels of four or more colors including a color in addition to the three primary colors, and which can display a high-quality image in which false colors or artifacts are suppressed.

An image display device which will be described below includes a pixel area in which a plurality of pixels are arranged in a matrix shape, and each of the pixels includes m (m is an integer which is equal to or greater than 4) sub pixels. In addition, when it is assumed that the colors of m sub-pixels which are included in one pixel are represented as C1, C2, ..., and Cm in the image display device, the m sub-pixels which continue from an arbitrary position includes all of the colors C1, C2, ..., and Cm in both the vertical direction and the horizontal direction of the pixel area.

According to the above configuration, it is possible to provide an image display device in which a pixel includes sub-pixels of four or more colors including a color in addition to the three primary colors and which can display a high-quality image in which false colors or artifacts are suppressed.

BRIEF DESCRIPTION OF DRAWINGS

FIG. 1 is a schematic diagram illustrating the arrangement of pixels in the display area of an image display device according to a first embodiment.

FIG. 2 is a schematic diagram illustrating the arrangement of pixels in the display area of the image display device according to the first embodiment.

FIG. 5 is a schematic diagram illustrating a situation that occurs when the high-resolution input image is displayed through sub-pixel rendering in the image display device according to the embodiment.

FIG. 6 is a schematic diagram illustrating a situation that occurs when the high-resolution input image of FIG. 4 is displayed through sub-pixel rendering in an image display device in which the arrangement of sub-pixels is different from that of the image display device according to the embodiment as a comparative example.

FIG. 12 is a schematic diagram illustrating a situation that occurs when the high-resolution input image is displayed through sub-pixel rendering in the image display device according to the second embodiment.

FIG. 13 is a schematic diagram illustrating a situation that occurs when the high-resolution input image of FIG. 11 is displayed through sub-pixel rendering in an image display device in which the arrangement of sub-pixels is different from that of the image display device according to the second embodiment as a comparative example.

FIG. 14 is a schematic diagram illustrating the arrangement of pixels in the display area of an image display device according to a third embodiment.

FIG. 15 is a schematic diagram illustrating the arrangement of pixels in the display area of the image display device according to the third embodiment.

FIG. 16C is a schematic diagram illustrating a situation in which a checker pattern is displayed in the arrangement of pixels according to the first embodiment.

FIG. 17A is a schematic diagram illustrating the arrangement of pixels according to the third embodiment.

FIG. 18 is a schematic diagram illustrating the arrangement of pixels in the display area of an image display device according to a fourth embodiment.

FIG. 19 is a schematic diagram illustrating the arrangement of pixels in the display area of the image display device according to the fourth embodiment.

FIG. 21 is a schematic diagram illustrating a situation that occurs when the high-resolution input image is displayed through sub-pixel rendering in the image display device according to the fourth embodiment.

FIG. 22 is a schematic diagram illustrating a situation that occurs when the high-resolution input image of FIG. 20 is displayed through sub-pixel rendering in an image display device in which the arrangement of sub-pixels is different from that of the image display device according to the fourth embodiment as a comparative example.

FIG. 23 is a schematic diagram illustrating the arrangement of sub-pixels in a unit pixel group of a pixel region according to a modification example of the fourth embodiment.

FIG. 24 is a schematic diagram illustrating the arrangement of sub-pixels in the unit pixel group of the pixel region according to the modification example of the fourth embodiment.

FIG. 25 is a schematic diagram illustrating the arrangement of sub-pixels in the unit pixel group of the pixel region according to the modification example of the fourth embodiment.

DESCRIPTION OF EMBODIMENTS

Figure 3:
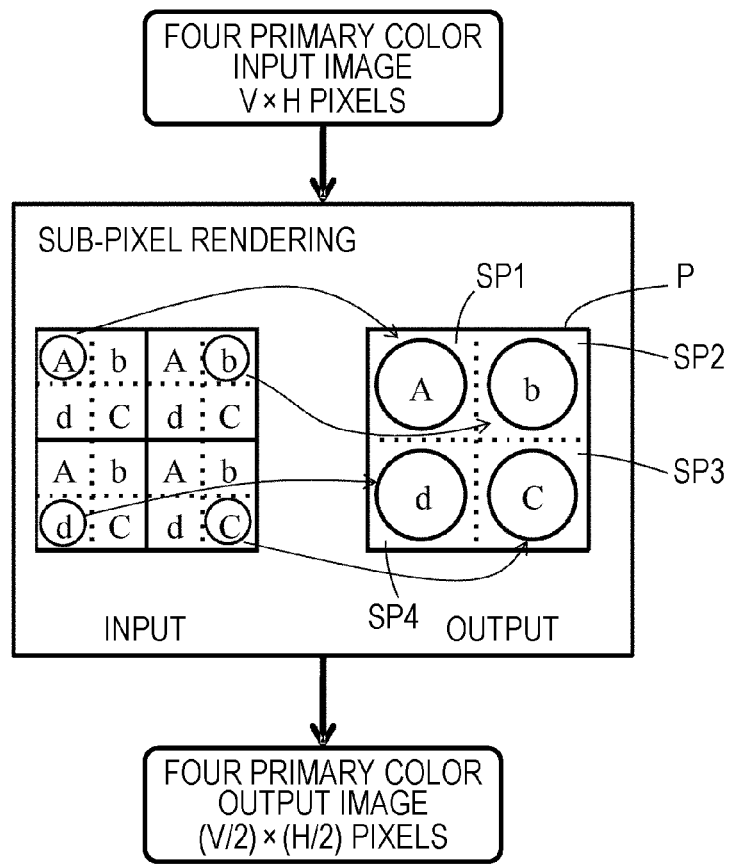
FIG. 3 is a schematic diagram illustrating a situation of image processing in sub-pixel rendering according to the related art.

An image display device according to an embodiment of the present invention includes a pixel area in which a plurality of pixels are arranged in a matrix shape, and each of the pixels includes m (m is an integer which is equal to or greater than 4) sub-pixels. When it is assumed that the colors of m sub-pixels which are included in one pixel are represented by $C1, C2, \ldots$, and $Cm$, a configuration is adopted in which the m sub-pixels which are sequentially arrayed from an arbitrary position include all of the colors $C1, C2, \ldots$, and $Cm$ in both the vertical direction and the horizontal direction of the pixel area (first configuration).

In such a configuration, the colors of m sub-pixels ($C1, C2, \ldots$, and $Cm$) which are included in one pixel may be different from each other or some colors may overlap. According to the first configuration, the m sub-pixels which are sequentially arrayed from an arbitrary position include all of the colors $C1, C2, \ldots$, and $Cm$ in both the vertical direction and the horizontal direction of the pixel area, and thus it is possible to improve the reproducibility of a high frequency signal without generating false colors or artifacts.

In the image display device according to the first configuration, it is preferable that the sub-pixels of colors, which are included in a group having a relatively high brightness, among the $C1, C2, \ldots$, and $Cm$ be arranged at equal intervals in the pixel area (second configuration). According to the configuration, it is possible to faithfully reproduce the high frequency signal.

In the image display device according to the first configuration, it is preferable that the sub-pixels of colors, which are included in a group having a relatively high brightness, among the $C1, C2, \ldots$, and $Cm$ be arranged such that the sub-pixels are not arranged at equal intervals in the pixel area (third configuration). According to the configuration, the respective sub-pixels are randomly arranged, and thus there is an advantage in that the arrangement of the sub-pixels is hardly noticeable.

It is preferable that the image display device according to any one of the first to third configurations further include an image processing unit to which an image having a resolution higher than the number of pixels in the pixel area is input, and which assigns grayscale data of the input image to corresponding sub-pixels (fourth configuration). Such an image process is called sub-pixel rendering. According to the configuration, it is possible to display an input image having a resolution higher than the number of pixels of the pixel area without generating false colors or artifacts.

In the image display device according to the fourth configuration, it is preferable that the image processing unit include: a high frequency signal extraction unit that determines whether or not the input image includes a high frequency signal in a specific direction; and a rendering processing unit which assigns the grayscale data of the input image to sub-pixels in order to maintain a resolution in the direction in which the input image is determined to include the high frequency signal (fifth configuration). According to the configuration, it is possible to display an input image having a resolution higher than the number of pixels of the pixel area without generating false colors or artifacts while maintaining a resolution in the direction in which the input image includes the high frequency signal.

In the image display device according to the fifth configuration, it is preferable that the high frequency signal extraction unit include a plurality of high-pass filters, and it is preferable that the rendering processing unit include: a weight calculation unit which calculates weight coefficients for the respective plurality of high-pass filters based on outputs of the plurality of high-pass filters; an integration unit which integrates the weight coefficients with the outputs from the respective plurality of high-pass filters; and a synthesis processing unit which synthesizes results of integration acquired by the integration unit (sixth configuration).

In addition, in the image display device according to the sixth configuration, it is preferable that the image processing unit further include a plurality of low-pass filters which are paired with the respective plurality of high-pass filters of the high frequency signal extraction unit, and it is preferable that the integration unit integrate the weight coefficients with outputs from the respective plurality of high-pass filters and outputs from the respective plurality of low-pass filters (seventh configuration).

In the image display device according to any one of the first to seventh configurations, it is preferable that m be 4 (eighth configuration). In particular, it is preferable that four sub-pixels be arranged such that two sub-pixels are arranged in the vertical direction and two sub-pixels are arranged in the horizontal direction.

In addition, in the image display device according to any one of the first to seventh configurations, it is preferable that m be 6 (ninth configuration).

In the image display device according to any one of the first to ninth configurations, it is preferable that the colors of $C1, C2, \ldots$, and $Cm$ include three primary colors, that is, red, green, and blue (tenth configuration). Further, in the image display device according to the tenth configuration, it is preferable that the colors of C1, C2, . . . , and Cm further include at least one color of cyan, magenta, yellow, and white (eleventh configuration).

Meanwhile, it is possible to implement the image display device according to any one of the first to eleventh configurations as a liquid crystal display device which includes a liquid crystal panel in which the pixel area is formed.

Hereinafter, more detailed embodiments of the present invention will be described with reference to the accompanying drawings. The same reference numerals designate the same or equivalent components in the drawings, and the description thereof will not be repeated.

First Embodiment

An image display device according to a first embodiment of the present invention will be described below. It is possible to configure the image display device according to the embodiment as, for example, a liquid crystal display device. However, the kind of the image display device is not limited to a liquid crystal display device. It is possible to implement the present invention using any kind of image display device under a condition that one pixel includes four or more sub-pixels and that it is possible to control display in sub-pixel units.

FIG. 1 is a schematic diagram illustrating the arrangement of pixels in the display area of the image display device according to the first embodiment. The image display device according to the embodiment includes a plurality of pixels in the display area. In FIG. 1, the boundaries of pixels P are represented by thin solid lines. Each of the pixels P includes a total of four sub-pixels, that is, two sub-pixels in the vertical direction and two sub-pixels in the horizontal direction. In FIG. 1, the boundaries of the sub-pixels SP are represented by dotted lines. In FIG. 1 and the description below, the colors of the sub-pixels SP are represented by four symbols (A, b, C, and d). Meanwhile, a region which is surrounded by a thick solid line in FIG. 1, which will be described later, represents a unit pixel group PG which includes four pixels P.

It is preferable that the four colors of the sub-pixels SP include red (R), green (G) and blue (B) which are known as the three primary colors of light. It is possible to use, for example, yellow (Ye), cyan (Cy), magenta (Mg), or white (W) as a remaining one color. Otherwise, the remaining one color may be selected from the three primary colors (R, G, and B). Otherwise, the remaining one color may be any one of the three primary colors (R, G, and B), having a different brightness or chroma. However, the colors of the sub-pixels SP are not limited to the above-described examples and it is possible to use any combination based on a color reproduction range which is necessary for the image display device or the color of an object to be displayed. Meanwhile, the colors of the sub-pixels are determined based on the colors of color filters which are layered on the respective sub-pixels in a case of a liquid crystal display device.

Meanwhile, in the four colors (A, b, C, d) of the sub-pixels SP, the color A and the color C which are represented by capital letters are included in a group which has a relatively higher brightness than those of the color b and the color d. For example, when R, G, B, and Ye are used as the four colors of the sub-pixels SP, G and Ye are included in the group of A and C, and R and B are included in a group of b and d.

In addition, as shown in FIG. 1, a total of four pixels P, that is, two pixels in the vertical direction and two pixels in the horizontal direction are included in a single unit pixel group PG. That is, in the display area of the image display device according to the first embodiment, the unit pixel group PG is repeatedly arranged in the vertical direction and the horizontal direction.

Here, the four pixels which are included in the unit pixel group PG are represented as pixels P1 to P4 as shown in FIG. 1. In the pixels P1 to P4 which are included in the unit pixel group PG1, the pixel P1 and the pixel P3 which are located in a diagonal direction with respect to each other have the same arrangement of sub-pixels. In the same manner, the pixel P2 and the pixel P4 have the same arrangement of sub-pixels.

In the pixel P1 and the pixel P3, sub-pixels of the colors A, b, C, and d are arranged in the clockwise direction from the upper left. In the pixel P2 and the pixel P4, sub-pixels of the colors C, d, A, and b are arranged in the clockwise direction from the upper left.

Since the sub-pixels have the above arrangements, the four sub-pixels which are sequentially arrayed from an arbitrary position always includes the four colors A, b, C, and d in both the vertical direction and the horizontal direction in the image display device according to the embodiment, as shown in FIG. 2. In addition, there is not a case in which the color A and the color C are adjacent to each other in both the vertical direction and the horizontal direction. As described above, since the colors A and C which have a relatively high brightness are arranged at equal intervals, there is an advantage in that it is effective for faithful reproduction of a high frequency signal.

Since the sub-pixels are arranged as described above, it is possible to realize the faithful reproduction of a high frequency signal in the image display device according to the embodiment. Meanwhile, the image display device according to the embodiment achieves a significant advantage in that it is possible to realize more faithful reproduction of a high frequency signal particularly when a high-resolution image is displayed by performing so-called sub-pixel rendering. A sub-pixel rendering is a method of displaying an image which has a resolution greater than the number of pixels included in a display device. A sub-pixel rendering process is performed by an image processing unit which is included in the image display device.

FIG. 3 is a schematic diagram illustrating a situation of image processing in sub-pixel rendering. An example in FIG. 3 is an example in which, when image data which includes V pixels in the vertical direction and H pixels in the horizontal direction, each pixel having four colors A, b, C, and d, is input, the image data is displayed in an image display device which includes (V/2) pixels in the vertical direction and (H/2) pixels in the horizontal direction. With regard to sub-pixels SP1 to SP4 of the image display device, grayscale data which includes the same colors as those of the respective sub-pixels is supplied from pixels which are present at positions corresponding to the respective sub-pixels in two pixels in the vertical direction and two pixels in the horizontal direction, that is, a total of four pixels of the input image data, as shown in FIG. 3.

That is, since the sub-pixel SP1 which is positioned at the upper left of the pixel P is a sub-pixel which displays the color A, the grayscale data of the color A of the pixel which is positioned at the upper left in the four pixels of the input image is supplied to the sub-pixel SP1. In the same manner, the grayscale data of the color b of the pixel which is positioned at the upper right in the four pixels of the input image is supplied to the sub-pixel SP2 of the color b which is positioned at the upper right of the pixel P. The grayscale data of the color C of the pixel which is positioned at the lower right in the four pixels of the input image is supplied to the sub-pixel SP3 of the color C which is positioned at the lower right of the pixel P. The grayscale data of the color d of the pixel which is positioned at the lower left in the four pixels of the input image is supplied to the sub-pixel SP4 of the color C which is positioned at the lower left of the pixel P.

It is possible to display an input image which has a resolution of V×H pixels in a display device which has a ¼ of this resolution, that is, (V/2)×(H/2) pixels through the above-described sub-pixel rendering process.

Figure 4:
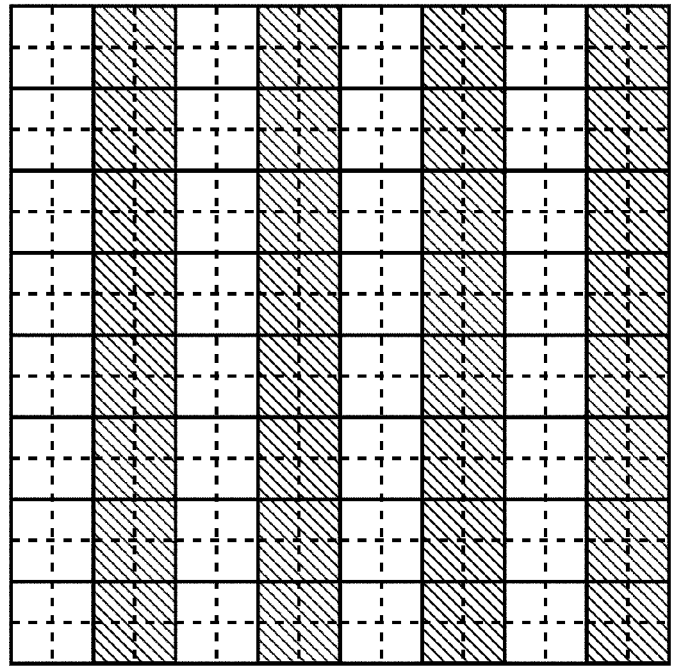
FIG. 4 is a schematic diagram illustrating an example of an image which includes the highest frequency in the horizontal direction as an example of a high-resolution input image.

Here, an advantage of the embodiment acquired when sub-pixel rendering is performed will be described with reference to FIGS. 4 to 6. FIG. 4 is a schematic diagram illustrating an example of an image which includes the highest frequency in the horizontal direction (a striped image in which white and black are displayed at every other pixel in parallel in the vertical direction) as an example of a high-resolution input image. Meanwhile, in FIG. 4, hatched areas represent black display spots and this is also the case in other drawings below. FIG. 5 is a schematic diagram illustrating a situation that occurs when the high-resolution input image is displayed through sub-pixel rendering in the image display device according to the embodiment. FIG. 6 is a schematic diagram illustrating a situation that occurs when the high-resolution input image of FIG. 4 is displayed through sub-pixel rendering in an image display device in which the arrangement of sub-pixels is different from that of the image display device according to the embodiment as a comparative example.

In the image display device according to the embodiment, when an input image shown in FIG. 4 is supplied, the upper left and lower left sub-pixels display the highest grayscale level and the upper right and lower right sub-pixels display the lowest grayscale level in the four sub-pixels included in one pixel through sub-pixel rendering as shown in FIG. 5. Therefore, the colors A, d, C, and b are periodically expressed in the vertical direction. Accordingly, since vertical lines are seen by the human eye in such a way that the colors A, d, C, and b are mixed, the vertical lines are recognized as white lines, and thus false colors are not generated.

On the other hand, in the image display device according to the comparative example, when the input image which is shown in FIG. 4 is supplied, only the color A and the color d are alternately displayed in the vertical direction as shown in FIG. 6. In this case, since the vertical lines are recognized as the mixed colors of the color A and the color d, white lines are not recognized and false colors are generated.

Therefore, as is apparent from comparison of FIGS. 5 and 6, according to the image display device according to the embodiment, an excellent advantage is acquired in that false colors are not generated when an image which includes a high frequency signal is displayed. Meanwhile, the advantage is similarly acquired when an image which includes the highest frequency signal in the vertical direction is input.

Second Embodiment

Figure 7:
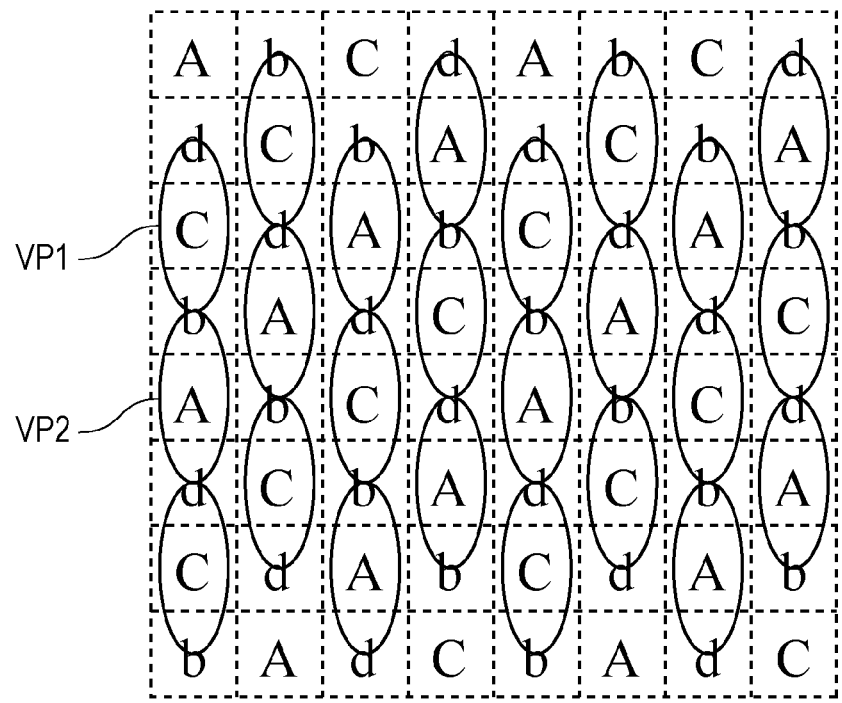
FIG. 7 is a schematic diagram illustrating the arrangement of virtual pixel groups of the image display device according to a second embodiment.
Figure 8:
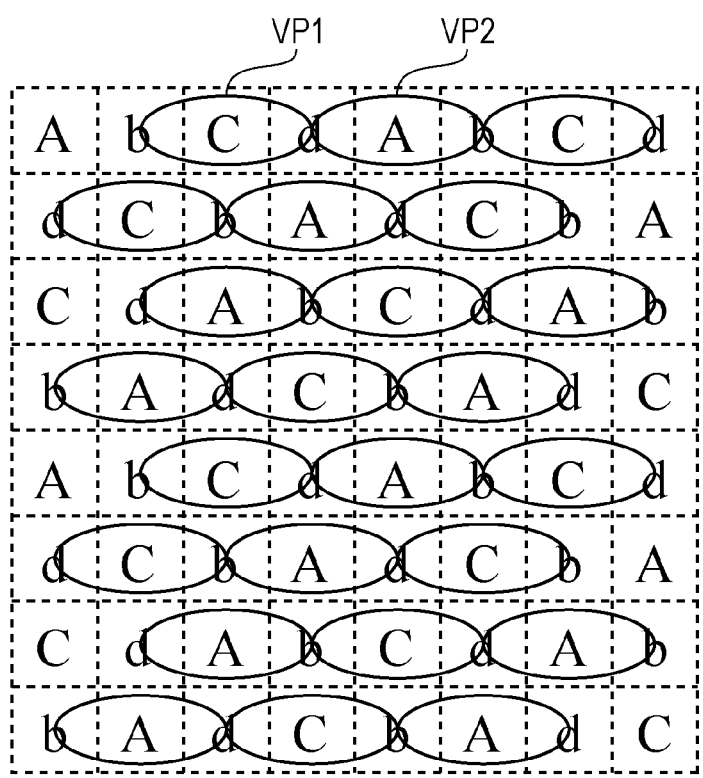
FIG. 8 is a schematic diagram illustrating the arrangement of the virtual pixel groups of the image display device according to the second embodiment.

FIGS. 7 and 8 are schematic diagrams illustrating the arrangement of virtual pixel groups of the image display device according to a second embodiment. A sub-pixel rendering method in the image display device according to the embodiment is different from that of the first embodiment.

That is, in the embodiment, it is possible to perform display while one of horizontal resolution and vertical resolution is maintained as the resolution of the input image. FIG. 7 is a schematic diagram illustrating the configuration of virtual pixels when the horizontal resolution is maintained as the resolution of the input image. FIG. 8 is a schematic diagram illustrating the configuration of virtual pixels when the vertical resolution is maintained as the resolution of the input image.

In an example of FIG. 7, the input image is rendered in two types of virtual pixels, that is, a virtual pixel VP1 which includes three sub-pixels of colors d, C, and b that are sequentially arrayed in the vertical direction and a virtual pixel VP2 which includes three sub-pixels of colors b, A, and d that are sequentially arrayed similarly in the vertical direction. In an example of FIG. 8, the input image is rendered in two types of virtual pixels, that is, a virtual pixel VP1 which includes three sub-pixels of colors d, C, and b that are sequentially arrayed in the horizontal direction and s virtual pixel VP2 which includes three sub-pixels of colors b, A, and d that are sequentially arrayed similarly in the horizontal direction. Meanwhile, here, the arrangement of two types of virtual pixels in order to maintain a horizontal resolution or a vertical resolution are illustrated. However, it is possible to use the arrangement of virtual pixels in order to maintain a resolution in the oblique direction in addition thereto.

Figure 9:
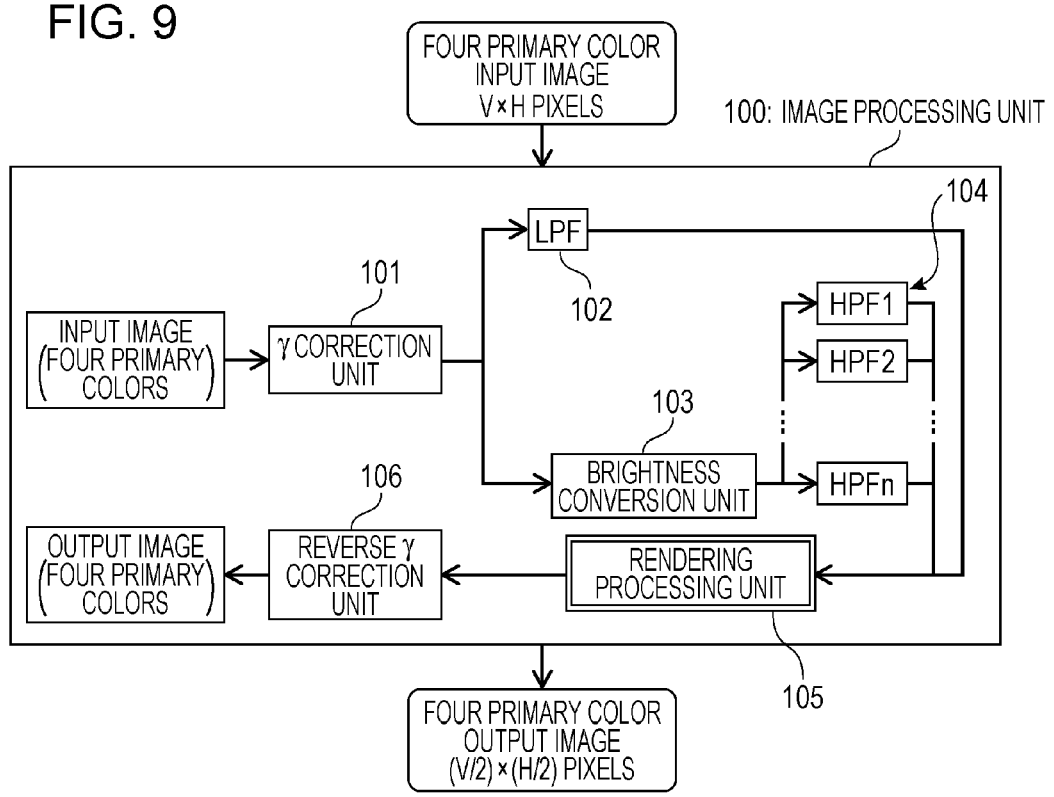
FIG. 9 is a block diagram illustrating a configuration in order to perform sub-pixel rendering in the image display device according to the second embodiment.

FIG. 9 is a block diagram illustrating a configuration in which sub-pixel rendering is performed in the image display device according to the embodiment. As shown in FIG. 9, the image display device according to the embodiment includes an image processing unit 100 to which four-colored input image (V×H pixels) is input and which outputs an image to be displayed in a (V/2)×(H/2) pixel area.

The image processing unit 100 includes a γ correction unit 101, a Low-Pass Filter (LPF) 102, a brightness conversion unit 103, a High-Pass Filter (HPF) unit 104, a rendering processing unit 105, and an inverse γ correction unit 106.

A γ correction process is performed on an input image signal by the γ correction unit 101. The image signal on which the γ correction process is performed is transmitted to each of the LPF 102 and the brightness conversion unit 103. The LPF 102 extracts low-pass components from the input image signal. Here, the extracted low-pass components include color components. The extracted low-pass components are transmitted to the rendering processing unit 105. The brightness conversion unit 103 converts the four-colored input image signal into a brightness signal, and transmits the brightness signal to the HPF unit 104.

The HPF unit 104 includes a plurality of high-pass filters (HPF1 to HPFn: n is an integer which is equal to or greater than 2), and extracts high frequency components in a plurality of directions, that is, in the horizontal direction, the vertical direction and the oblique direction from the input image signal. Meanwhile, in a case of the embodiment, setting is made such that n=2, and high frequency components in two directions, that is, in the horizontal direction and in the vertical direction may be extracted. When there is a lot of high frequency components in the specific direction in the input image signal, the output absolute value of a high-pass filter corresponding to the direction becomes large. Therefore, it is possible to determine a direction in which a lot of high frequency components are included, in other words, a direction in which image reproduction should be considered as being important by comparing the outputs of the plurality of high-pass filters in the HPF unit 104.

The rendering processing unit 105 assigns a brightness signal corresponding to the virtual pixels based on the size of the output absolute value of each high-pass filter in the HPF unit 104. For example, in the case of the embodiment, it is assumed that the HPF 1 extracts high frequency components in the vertical direction and the HPF 2 extracts high frequency components in the horizontal direction, respectively. For example, when the output absolute value of the HPF 1 is greater than the output absolute value of the HPF 2, it is determined that a lot of high frequency components are included in the vertical direction of the input image. In this case, the rendering processing unit 105 assigns the brightness signal such that the virtual pixel group shown in FIG. 8 is implemented. In contrast, when the output absolute value of the HPF 2 is greater than the output absolute value of the HPF 1, it is determined that a lot of high frequency components are included in the horizontal direction of the input image. In this case, the rendering processing unit 105 assigns the brightness signal such that the virtual pixel group shown in FIG. 7 is implemented.

Figure 10:
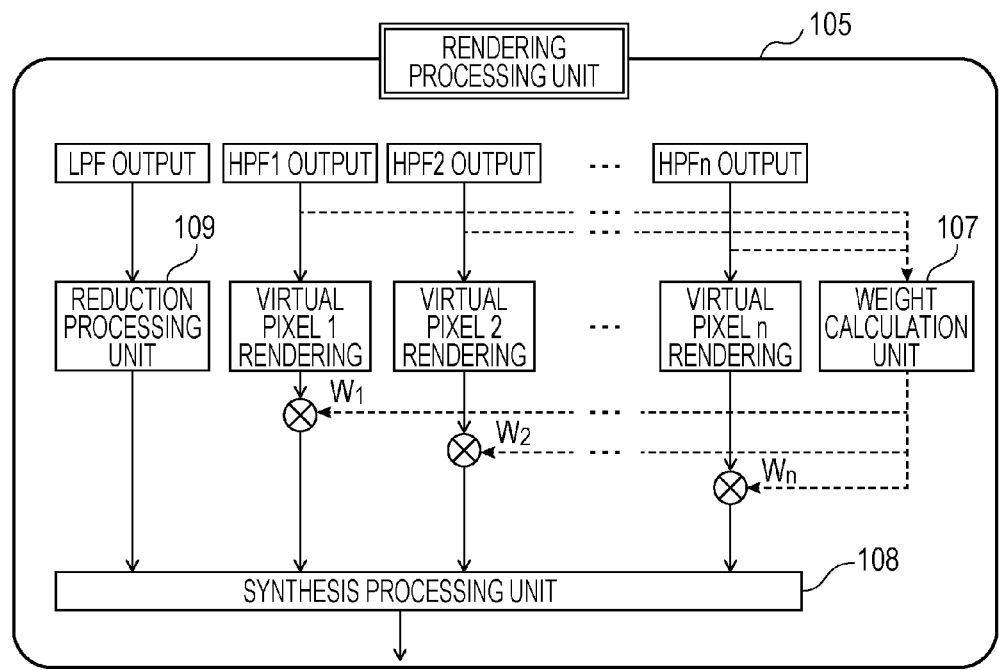
FIG. 10 is a block diagram illustrating the internal configuration of a rendering processing unit shown in FIG. 9.

FIG. 10 is a block diagram illustrating the internal configuration of the rendering processing unit 105. As shown in FIG. 10, the rendering processing unit 105 includes a weight calculation unit 107. The weight calculation unit 107 compares outputs from the plurality of high-pass filters (HPF1 to HPFn) of the HPF unit 104, and calculates weight coefficients (w1 to wn) to be supplied to the outputs from the high-pass filters.

The weight coefficients which are calculated by the weight calculation unit 107 are integrated with the outputs from the respective high-pass filters. A reduction process is performed on the output from the LPF 102 (a low-pass side signal which includes color components) by the reduction processing unit 109. Further, the result of the reduction process and results, which are acquired by integrating the outputs from the high-pass filters with the weight coefficients, are composed by a synthesis processing unit 108. A result processed by the synthesis processing unit 108 is transmitted to the inverse γ correction unit 106, and inverse γ correction is performed thereon. The sub-pixel rendering process is completed by performing the above processes.

Meanwhile, although a processing example, in which the input image includes four colors and the output image includes four colors, is illustrated in the embodiment, a block that converts an input image which includes the three primary colors into four colors (the three primary colors and another one color) may be added to the image processing unit 100.

Figure 11:
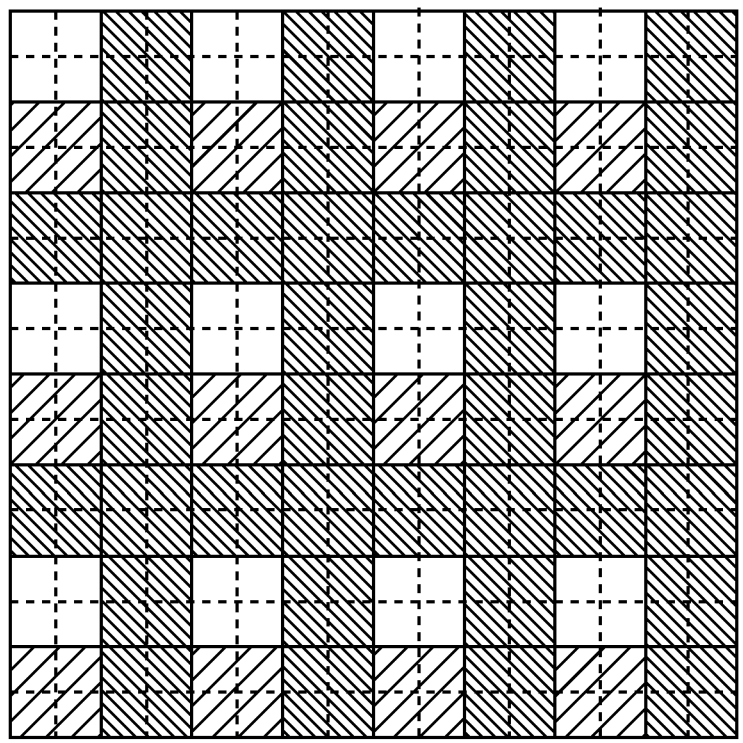
FIG. 11 is a schematic diagram illustrating an example of an image which includes the highest frequency in the horizontal direction as an example of the high-resolution input image.

Here, an advantage of the image display device according to the embodiment will be described with reference to FIGS. 11 to 13. FIG. 11 is a schematic diagram illustrating an example of an image which includes the highest frequency in the horizontal direction as an example of the high-resolution input image. Meanwhile, in FIG. 11, spots which are represented by hatching of dense diagonal lines are black display spots, and spots which are represented by scattered hatching are half-tone display spots. FIG. 12 is a schematic diagram illustrating a situation that occurs when the high-resolution input image is displayed through sub-pixel rendering in the image display device according to the embodiment. FIG. 13 is a schematic diagram illustrating a situation that occurs when the high-resolution input image of FIG. 11 is displayed through sub-pixel rendering in an image display device in which the arrangement of sub-pixels is different from that of the image display device according to the embodiment as a comparative example.

In the image display device according to the embodiment, the colors A, d, and b are periodically expressed in the vertical direction as shown in FIG. 12 when the input image shown in FIG. 11 is supplied. Therefore, since vertical lines are seen by the human eye in such a way that the colors A, d, and b are mixed, false colors are not generated.

On the other hand, in the image display device according to the comparative example, only the color A and the color d are alternately expressed in the vertical direction as shown in FIG. 13 when the input image shown in FIG. 11 is supplied. In this case, since the vertical lines are recognized as the mixed color of the color A and the color d, false colors are generated.

Therefore, as is apparent from comparison of FIGS. 12 and 13, according to the image display device according to the embodiment, an excellent advantage is acquired in that false colors are not generated when an image which includes a high frequency signal is displayed.

In addition, in the image display device according to the embodiment, sub-pixel rendering is performed in order to detect the vertical direction or the horizontal direction in which there are a lot of high frequency components and to maintain the number of pixels in the direction in which there are a lot of high frequency components. In addition, since rendering is performed on the virtual pixels which each include three sub-pixels as shown in FIGS. 7 and 8, it is possible to represent resolution corresponding to the number of pixels even in the direction in which there is less high frequency components.

Third Embodiment

An image display device according to a third embodiment includes different arrangement of sub-pixels from that of the image display device according to the first embodiment.

Figures 14, 15:
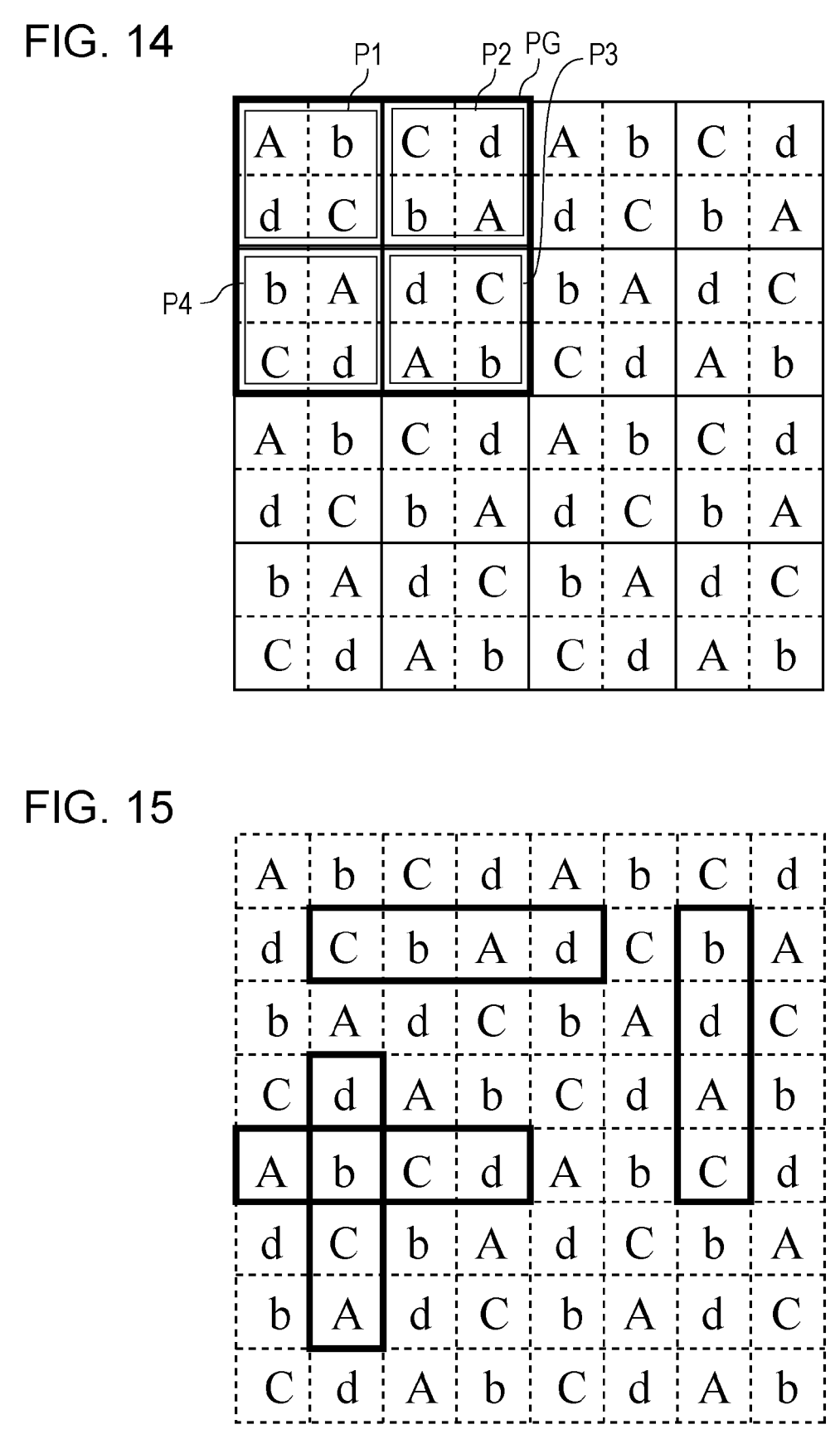

FIGS. 14 and 15 are schematic diagrams illustrating the arrangement of pixels in the display area of the image display device according to the embodiment. As shown in FIGS. 14 and 15, the image display device according to the embodiment is the same as the first embodiment in that one pixel P includes four sub-pixels SP and four pixels P are included in a unit pixel group PG.

However, the image display device according to the embodiment is different from the first embodiment in that the arrangements of sub-pixels are different from each other in the four pixels which are included in the unit pixel group PG. That is, in the first embodiment, the pixel P1 and the pixel P3 which are positioned in the diagonal direction have the same arrangement of sub-pixels in the pixels P1 to P4 which are included in the unit pixel group PG as shown in FIG. 1. In addition, the pixel P2 and the pixel P4 have the same arrangement of sub-pixels.

In contrast, in the embodiment, the pixel P1 is arranged with sub-pixels of colors A, b, C, and d which are arranged in the clockwise direction from the upper left and the pixel P2 is arranged with sub-pixels of colors C, d, A, and b which are arranged in the clockwise direction from the upper left, as shown in FIG. 14. The pixel P3 is arranged with sub-pixels of colors d, C, b, and A which are arranged in the clockwise direction from the upper left and the pixel P4 is arranged with sub-pixels of colors b, A, d, and C which are arranged in the clockwise direction from the upper left. That is, in the embodiment, sub-pixels (color A and color C) which have high brightness are not dispersed at equal intervals unlike the first embodiment.

Meanwhile, with the arrangement, four sub-pixels which are sequentially arrayed from an arbitrary position always include four colors A, b, C, and d in both the vertical direction and the horizontal direction as shown in FIG. 15.

Further, as being understood based on the comparison of FIGS. 1 and 14, the sub-pixel of the color A and the sub-pixel of the color C are arranged continuously in the oblique direction (direction which falls toward the left) in the arrangement of FIG. 1. However, the color A and the color C are not sequentially arrayed even in the oblique direction in the arrangement of FIG. 14. In addition, the sub-pixel of the color b and the sub-pixel of the color d are arranged continuously in the direction which falls toward the right in the arrangement of FIG. 1. However, the color b and the color d are not sequentially arrayed even in the oblique direction in the arrangement of FIG. 14.

Figures 16A, 16B:
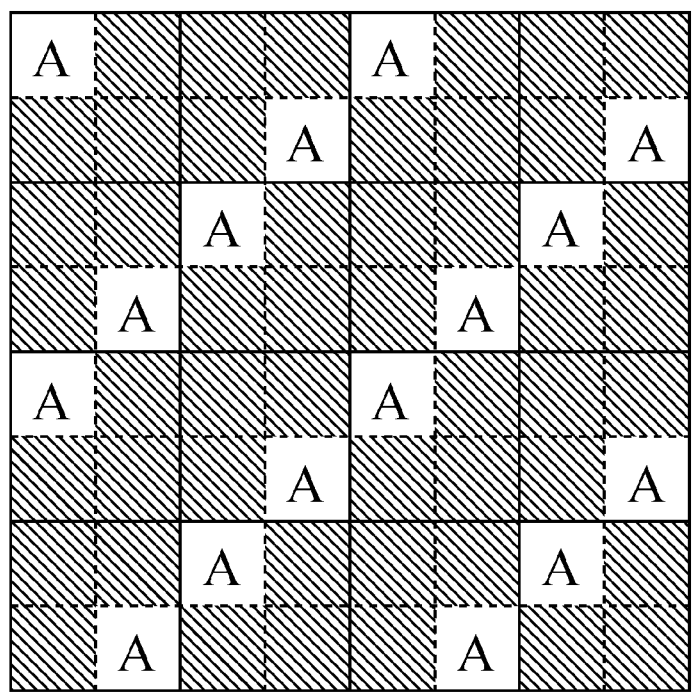
FIG. 16A is a schematic diagram illustrating the arrangement of pixels according to the first embodiment.
FIG. 16B is a schematic diagram illustrating a situation in which an image of a single color A is displayed in the arrangement of pixels according to the first embodiment.
Figures 16C, 17A:
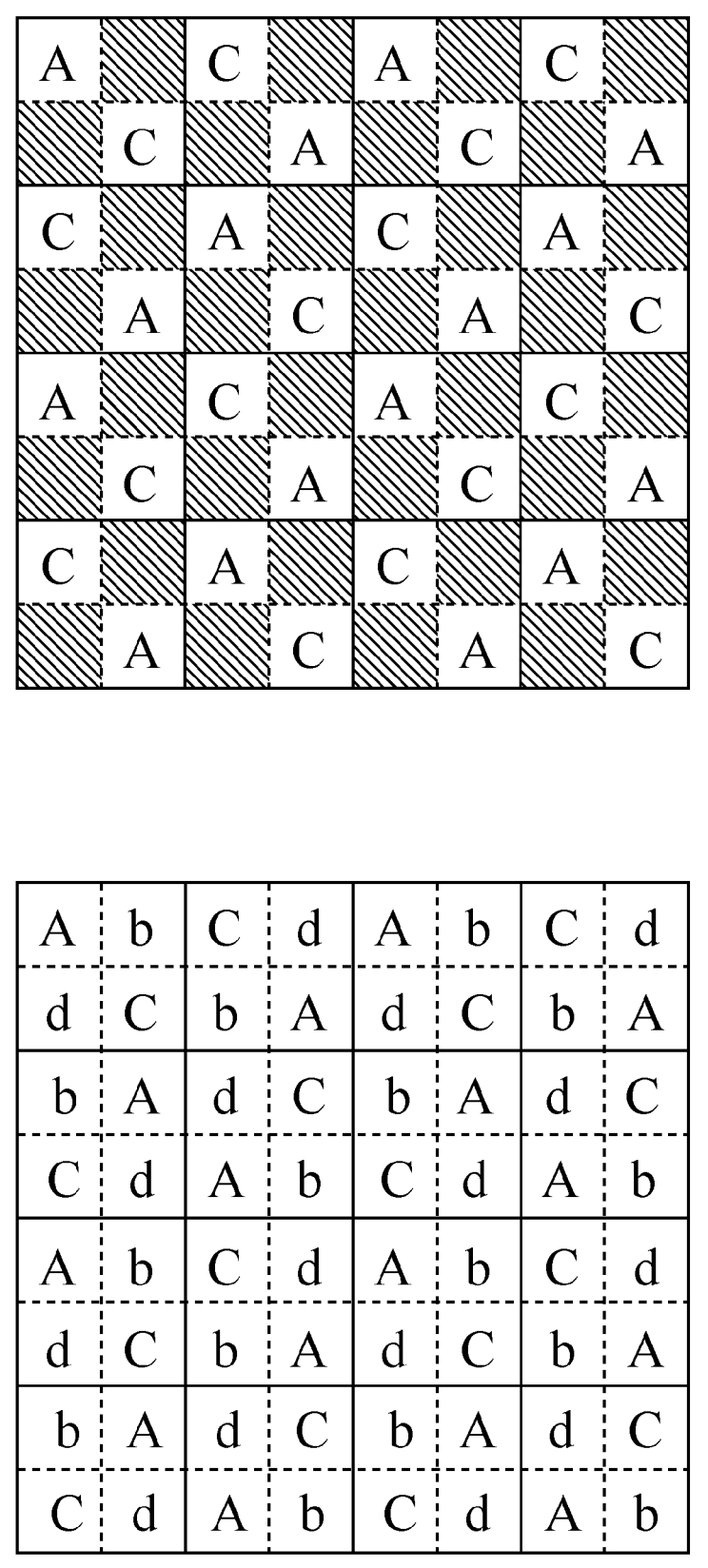
Figure 17B:
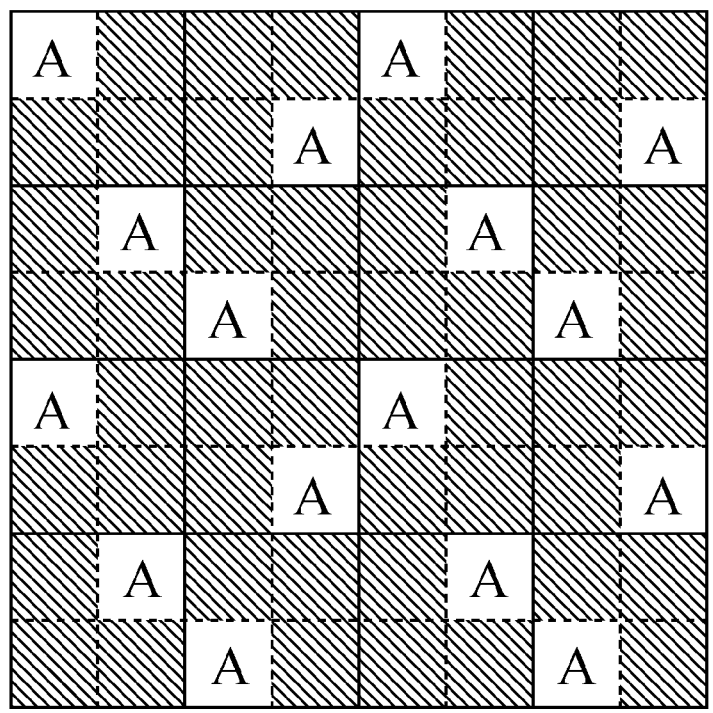
FIG. 17B is a schematic diagram illustrating a situation in which an image of a single color A is displayed in the arrangement of pixels according to the third embodiment.
Figure 17C:
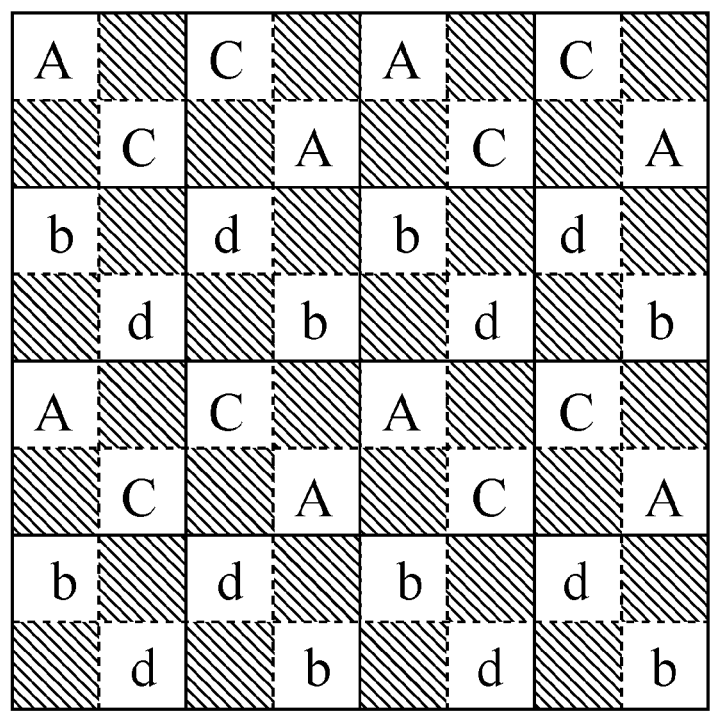
FIG. 17C is a schematic diagram illustrating a situation in which a checker pattern is displayed in the arrangement of pixels according to the third embodiment.

Therefore, an advantage below can be acquired. For example, FIGS. 16A to 16C are schematic diagrams respectively illustrating the arrangement of pixels according to the first embodiment, a situation in which a single color image of color A is displayed using the arrangement of pixels, and a situation in which a checker pattern is displayed. FIGS. 17A to 17C are schematic diagrams respectively illustrating the arrangement of pixels according to the third embodiment, a situation in which a single color image of color A is displayed using the arrangement of pixels, and a situation in which a checker pattern is displayed.

As being understood based on the comparison of FIGS. 16B and 17B, since the sub-pixels of color A are regularly arranged in the arrangement of pixels according to the first embodiment, there is a disadvantage in that the line-shaped arrangement of sub-pixels of color A is noticeable when the single color image of color A is displayed. Such a line-shaped arrangement is easily perceived as artifacts (images which do not exist in an original image). On the other hand, in the arrangement of pixels according to the embodiment, the sub-pixels of color A are randomly arranged compared to the first embodiment, and thus it is difficult to perceive artifacts.

In addition, as being understood based on the comparison of FIGS. 16C and 17C, when the checker pattern is displayed, high grayscale data is supplied to only the sub-pixels of color A and color C in the arrangement of pixels according to the first embodiment, and thus there is a disadvantage in that false colors are generated. On the other hand, the sub-pixels of colors A, b, C, and d are randomly arranged in the arrangement of pixels according to the embodiment compared to the first embodiment. Therefore, even when the checker pattern is displayed, all of the four colors of colors A, b, C, and d are displayed. Accordingly, a pattern of sub-pixels of specific color is not noticeable, and thus false colors are not generated.

Fourth Embodiment

Figures 18, 19:
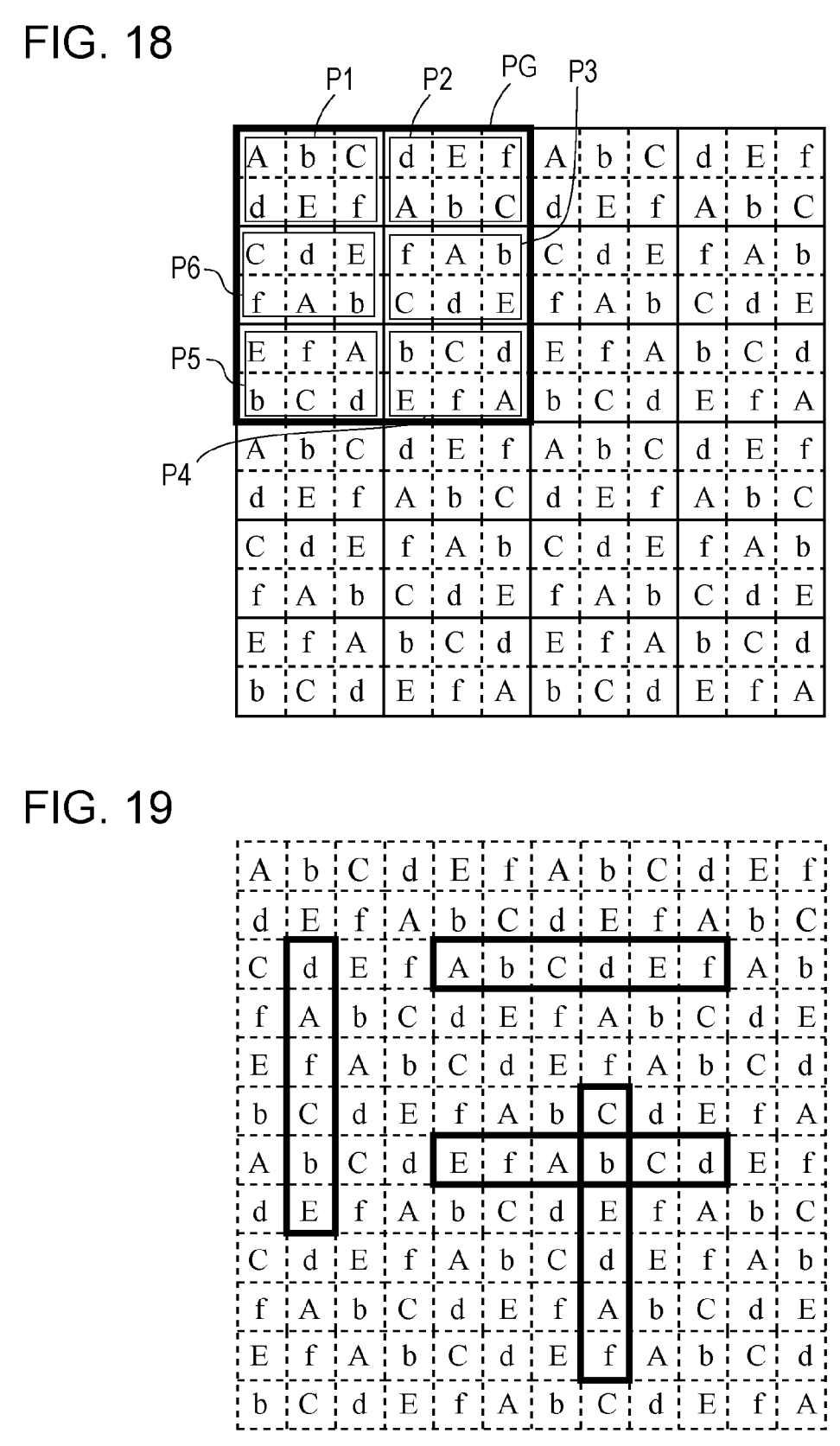

FIGS. 18 and 19 are schematic diagrams illustrating the arrangement of pixels in the display area of an image display device according to a fourth embodiment. As shown in FIGS. 18 and 19, the image display device according to the embodiment is different from that of the first embodiment in that one pixel P includes six sub-pixels SP and the six pixels P are included in a unit pixel group PG.

In the embodiment, a single unit pixel group PG includes pixels P1 to P6 which are arranged in the clockwise direction from the upper left. The pixel P1 includes six sub-pixels of colors A, b, C, f, E, and d which are arranged in the clockwise direction from the upper left. The pixel P2 includes six sub-pixels of colors d, E, f, C, b, and A which are arranged in the clockwise direction from the upper left. The pixel P3 includes the six sub-pixels of colors f, A, b, E, d, and C which are arranged in the clockwise direction from the upper left. The pixel P4 includes the six sub-pixels of colors b, C, d, A, f, and E which are arranged in the clockwise direction from the upper left. The pixel P5 includes the six sub-pixels of colors E, f, A, d, C, and b which are arranged in the clockwise direction from the upper left. The pixel P6 includes the six sub-pixels of colors C, d, E, b, A, and f which are arranged in the clockwise direction from the upper left.

Meanwhile, in the colors A, b, C, d, E, and f which are six colors of the sub-pixels, the colors A, C, and E are included in a color group which has higher brightness than that of the colors b, d, and f. It is preferable that the colors A, b, C, d, E, and f include red (R), green (G), and blue (B) which are known as the three primary colors of light. It is possible to use, for example, yellow (Ye), cyan (Cy), magenta (Mg), and white (W) as the remaining three colors. Otherwise, the remaining three colors may be selected from the three primary colors (R, G, and B). Otherwise, the remaining three colors may be selected from the three primary colors (R, G, and B), having a different brightness or chroma. For example, when R, G, B, Ye, Cy, and Mg are used as the four colors of the sub-pixels SP, G, Ye and Cy are included in a group of A, C and E, and R, B, and Mg are included in a group of b, d, and f.

However, the colors of the sub-pixels SP are not limited to the example described here and it is possible to use any combination depending on the color reproduction range which is necessary for the image display device or an object color to be displayed. Meanwhile, in a case of a liquid crystal display device, the colors of the sub-pixels are determined by the colors of color filters which are laminated on the respective sub-pixels.

Meanwhile, base on the above arrangement, six sub-pixels which are sequentially arrayed from an arbitrary position always include six colors of A, b, C, d, E, and f in both the vertical direction and the horizontal direction as shown in FIG. 19. In addition, the color A, the color C, and the color E which are included in a group which has a relatively high brightness are not adjacent to each other in both the vertical direction and the horizontal direction. Further, the colors A, C, and E which have a relatively high brightness are dispersed at equal intervals. This is available for faithful reproduction of the high frequency signal.

Figure 20:
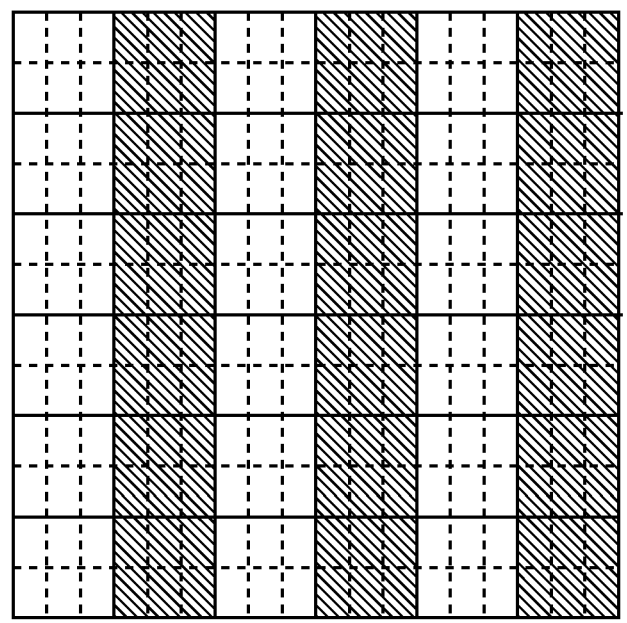
FIG. 20 is a schematic diagram illustrating an example of an image which includes the highest frequency in the horizontal direction as an example of the high-resolution input image.

Here, an advantage based on the above-described arrangement will be described with reference to FIGS. 20 to 22. FIG. 20 is a schematic diagram illustrating an example of an image which includes the highest frequency in the horizontal direction as an example of the high-resolution input image. FIG. 21 is a schematic diagram illustrating a situation that occurs when the high-resolution input image is displayed through sub-pixel rendering in the image display device according to the embodiment. FIG. 22 is a schematic diagram illustrating a situation that occurs when the high-resolution input image of FIG. 20 is displayed through sub-pixel rendering in an image display device in which the arrangement of sub-pixels is different from that of the image display device according to the embodiment as a comparative example.

When an input image shown in FIG. 20 is supplied, in the image display device according to the embodiment, all of the six colors of the sub-pixels are represented as the six colors which are sequentially arrayed in the vertical direction, as shown in FIG. 21. Therefore, since vertical lines are seen as white color with human eyes, and thus false colors are not generated.

On the other hand, when the input image shown in FIG. 20 is supplied, in the image display device according to the comparative example, only the color A and color d, only the color C and the color f, or only the color b and color E are alternately expressed in the vertical direction as shown in FIG. 22. In this case, vertical lines are recognized as the mixed color of the color A and the color d, the mixed color of the color C and the color f, or the mixed color of the color b and the color E, and thus false colors are generated.

Therefore, as is apparent from comparison of FIGS. 21 and 22, according to the image display device according to the embodiment, an excellent advantage is acquired in that false colors are not generated when an image which includes a high frequency signal is displayed. Meanwhile, such an advantage is acquired in the same manner even when an image which includes the highest frequency signal in the vertical direction is input.

In addition, as a modification example according to the embodiment, the arrangement of the sub-pixels in the unit pixel group of the pixel area may be used as a pattern shown in FIGS. 23 to 25, and the same advantage as the above may be acquired.

For example, an example of FIG. 23 is a pattern in which vertical sub-pixel columns of the pixel P3 and the pixel P5 which are included in the unit pixel group shown in FIG. 18 are shifted. That is, in the example, the pixel P3 includes six sub-pixels of colors C, d, E, b, A, and f which are arranged in the clockwise direction from the upper left. Pixel P5 includes six sub-pixels of colors f, A, b, E, d, and C which are arranged in the clockwise direction from the upper left.

An example of FIG. 24 is a pattern which is acquired by shifting the row direction to the column direction in the arrangement of the unit pixel groups shown in FIG. 18. In addition, an example of FIG. 25 is a pattern which is acquired by shifting the left and right of sub-pixels of a middle pixel of the unit pixel group shown in FIG. 24 in the horizontal direction.

According to the patterns shown in FIGS. 18 and 24, the sub-pixels of high-brightness colors (the colors A, C, and E) are arranged at equal intervals, and thus there is an advantage of being appropriate to the faithful reproduction of the high frequency signal. In contrast, as shown in FIG. 23 or 25, according to a pattern in which the sub-pixels of high-brightness colors (the colors A, C, and E) are not arranged at equal intervals, it is possible to more effectively suppress the generation of false colors.

Fifth Embodiment

Figure 26:
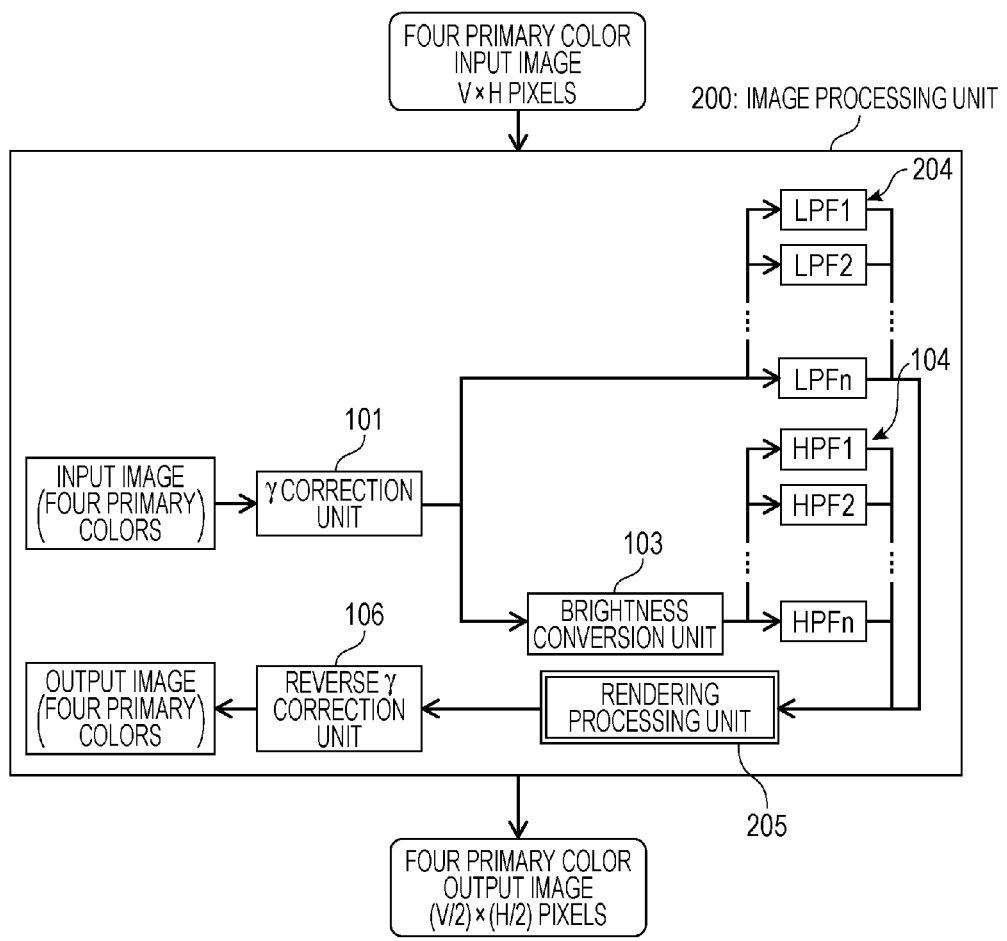
FIG. 26 is a block diagram illustrating a configuration in order to perform sub-pixel rendering in an image display device according to a fifth embodiment.

FIG. 26 is a block diagram illustrating a configuration in order to perform sub-pixel rendering in the image display device according to the embodiment. As shown in FIG. 26, the image display device according to the embodiment includes an image processing unit 200 to which an input image including four colors (V×H pixels) is input and which outputs an image to be displayed in a (V/2)×(H/2) pixel area.

The image processing unit 200 includes a γ correction unit 101, a brightness conversion unit 103, a High-Pass Filter (HPF) unit 104, a Low-Pass Filter (LPF) unit 204, a rendering processing unit 205, and an inverse γ correction unit 106.

A γ correction process is performed on an input image signal by the γ correction unit 101. The image signal on which the γ correction process is performed is transmitted to each of the LPF unit 204 and the brightness conversion unit 103. The LPF unit 204 includes a plurality of low-pass filters (LPF1 to LPFn: n is an integer which is equal to or greater than 2), and extracts low frequency components in a plurality of directions, such as the horizontal direction, the vertical direction, and the oblique direction, from the input image signal. For example, n=2 and low frequency components in two directions, that is, in the horizontal direction and the vertical direction may be extracted. Here, the extracted low-pass components include color components. The extracted low-pass components are transmitted to the rendering processing unit 205. Meanwhile, the brightness conversion unit 103 converts the input image signal of four colors into a brightness signal, and transmits the brightness signal to the HPF unit 104.

The HPF unit 104 includes high-pass filters (HPF1 to HPFn: n is an integer which is equal to or greater than 2), the number of which is the same as the n low-pass filters LPF1 to LPFn of the LPF unit 204. The high-pass filters extract high frequency components in a plurality of directions, that is, in the horizontal direction, the vertical direction, and the oblique direction from the input image signal. When there are a lot of high frequency components in a specific direction in the input image signal, the output absolute value of the high-pass filter which corresponds to the direction becomes large. Therefore, it is possible to determine a direction in which a lot of high frequency components are included, in other words, a direction in which image reproduction should be considered as being important by comparing the outputs of the plurality of high-pass filters in the HPF unit 104.

Meanwhile, in the LPF unit 204 and the HPF unit 104, an HPFx and an HPFx (x is an integer between 1 to n) make a pair. It is preferable to use a combination of filters such that the impulse response of a combination of the LPFx and the HPFx be a delta function δ (unit impulse response). The reason for this is that it is possible to reproduce the frequency components of the input signal without high-pass enhancement, which causes artifacts to be generated, by using such a combination of filters. For example, when five-tap LPFx is supplied to [a, b, c, d, e], it is preferable to set the HPFx corresponding to the LPFx to [−a, −b, 1−c, −d, −e] such that LPFx+HPFx=[0, 0, 1, 0, 0].

Figure 27:
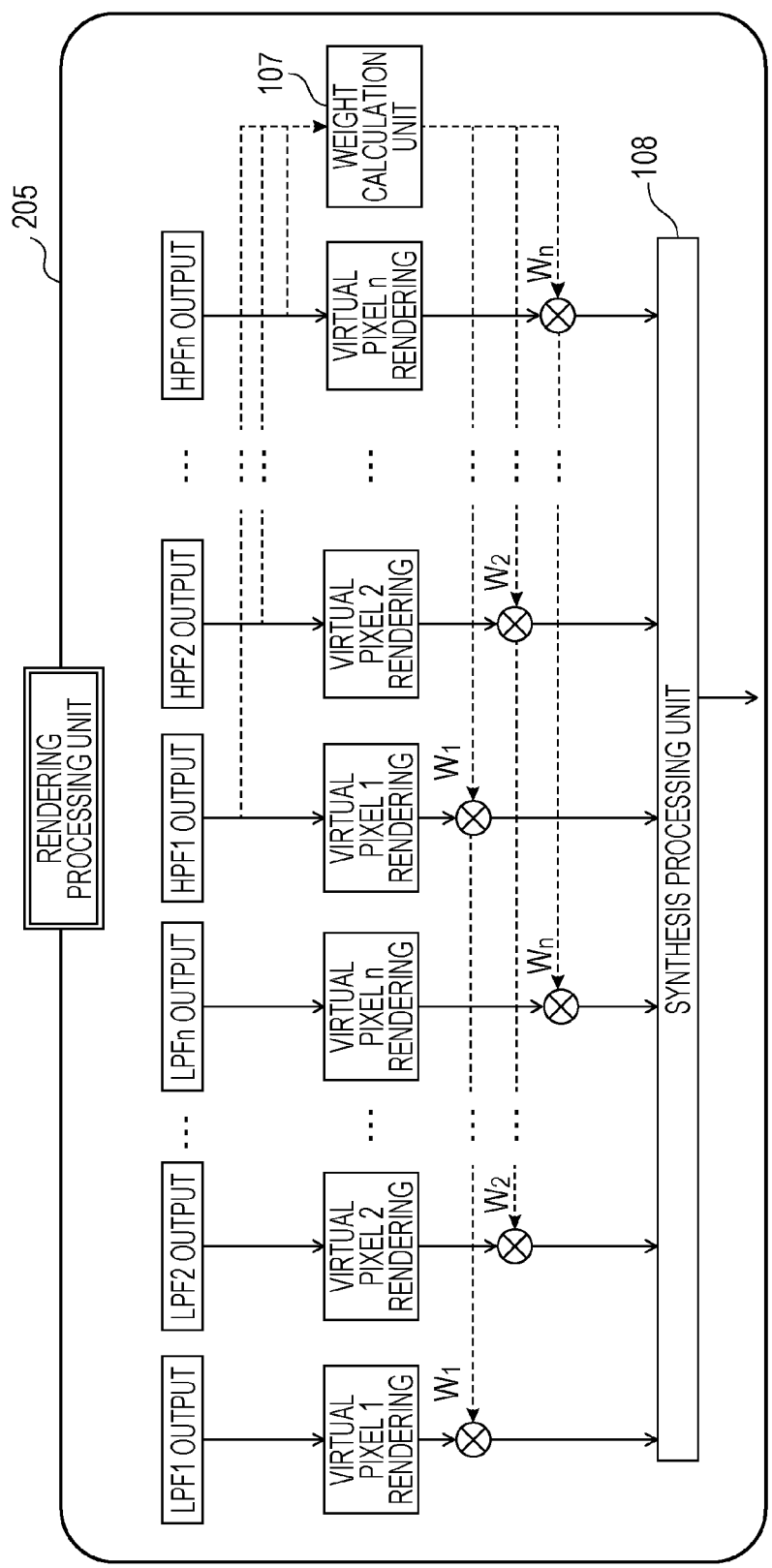
FIG. 27 is a block diagram illustrating the internal configuration of a rendering processing unit shown in FIG. 26.

FIG. 27 is a block diagram illustrating the internal configuration of the rendering processing unit 205. As shown in FIG. 27, the weight calculation unit 107 of the rendering processing unit 205 compares outputs from the plurality of high-pass filters (HPF1 to HPFn) of the HPF unit 104, and calculates weight coefficients (w1 to wn) to be supplied to the outputs from the high-pass filters.

In the rendering processing unit 205 according to the embodiment, the weight coefficients which are calculated by the weight calculation unit 107 are integrated with the outputs of the low-pass filters (LPF1 to LPFn), which correspond to the respective high-pass filters, in addition to the outputs from the high-pass filters (HPF1 to HPFn). That is, for example, the weight coefficient w1 is integrated with both the output from the LPF1 and the output from the HPF1. The results in which the weight coefficients are integrated are synthesized by the synthesis processing unit 108. The processing result acquired by the synthesis processing unit 108 is transmitted to the inverse γ correction unit 106, and inverse γ correction is performed thereon. The sub-pixel rendering process is completed by performing the above processes.

With the above processes, there is an advantage in that it is possible to perform rendering on an image which includes a lot of high frequency components without generating artifacts which cause image quality to be deteriorated, compared to the second embodiment in which the output of a single low-pass filter is used.

Meanwhile, although a processing example in which an input image includes four colors and an output image includes four colors has been illustrated in the embodiment, a block which converts an input image which includes the three primary colors into four colors (the three primary colors and another one color) may be added to the image processing unit 200.

As described, although the embodiments of the present invention have been described, the above-described embodiments are only examples in order to implement the present invention. Therefore, the present invention is not limited to the above-described embodiments and can be implemented by appropriately modifying the above-described embodiments without departing from the gist of the invention.

The invention claimed is:

1. An image display device comprising:
a pixel area in which a plurality of pixels are arranged in a matrix shape, each of the pixels including m (m is an integer which is equal to or greater than 4) sub-pixels; and
an image processing unit to which an image having a resolution higher than the number of pixels in the pixel area is input, and which assigns grayscale data of the input image to corresponding sub-pixels, wherein
when it is assumed that colors of m sub-pixels which are included in one pixel are represented as C1, C2, . . . , and Cm, the m sub-pixels which are sequentially arranged from an arbitrary position include all of the colors of C1, C2, . . . , and Cm in both a vertical direction and a horizontal direction in the pixel area; and
the C1, C2, . . . , and Cm include a color included in a first group and a color included in a second group having a higher brightness than the color included in the first group, and the sub-pixels with the color included in the second group are arranged at equal intervals in the pixel area.

2. The image display device according to claim 1,
wherein the C1, C2, . . . , and Cm include a color included in a first group and a color included in a second group having a higher brightness than the color included in the first group, and the sub-pixels with the color included in the second group are arranged such that three or more sub-pixels are not sequentially arranged in a diagonal direction in the pixel area.

3. The image display device according to claim 1, wherein the image processing unit:
determines whether or not the input image includes a high frequency signal in a specific direction; and
assigns the grayscale data of the input image to sub-pixels in order to maintain a resolution in the direction in which the input image is determined to include the high frequency signal.

4. The image display device according to claim 3, wherein the image processing unit includes a plurality of high-pass filters, and wherein, when assigning the greyscale data, the image processing unit:
calculates weight coefficients for the respective plurality of high-pass filters, based on outputs of the plurality of high-pass filters;
integrates the weight coefficients with the outputs from the respective plurality of high-pass filters; and
synthesizes results of integration.

5. The image display device according to claim 4,
wherein the image processing unit further includes a plurality of low-pass filters which are paired with the respective plurality of high-pass filters, and
wherein, when integrating the weight coefficients, the image processing unit integrates the weight coefficients with outputs from the respective plurality of high-pass filters and outputs from the respective plurality of low-pass filters.

6. The image display device according to claim 1,
wherein m is 4.

7. The image display device according to claim 1,
wherein m is 6.

8. The image display device according to claim 1,
wherein the colors of C1, C2, . . . , and Cm include three primary colors, that is, red, green, and blue.

9. The image display device according to claim 8,
wherein the colors of C1, C2, . . . , and Cm further include at least one color of cyan, magenta, yellow, and white.

10. The image display device according to claim 1, comprising:
a liquid crystal panel in which the pixel area is formed.

11. An image display device comprising:
a pixel area in which a plurality of pixels are arranged in a matrix shape, each of the pixels including m (m is an integer which is equal to or greater than 4) sub-pixels; and
an image processing unit to which an image having a resolution higher than the number of pixels in the pixel area is input, and which assigns grayscale data of the input image to corresponding sub-pixels,
wherein, when it is assumed that colors of m sub-pixels which are included in one pixel are represented as C1, C2, . . . , and Cm, the m sub-pixels which are sequentially arranged from an arbitrary position include all of the colors of C1, C2, . . . , and Cm in both a vertical direction and a horizontal direction in the pixel area,
wherein the image processing unit:
determines whether or not the input image includes a high frequency signal in a specific direction; and
assigns the grayscale data of the input image to subpixels in order to maintain a resolution in the direction in which the input image is determined to include the high frequency signal,
wherein the image processing unit includes a plurality of high-pass filters, and
wherein, when assigning the greyscale data, the image processing unit:
calculates weight coefficients for the respective plurality of high-pass filters, based on outputs of the plurality of high-pass filters;
integrates the weight coefficients with the outputs from the respective plurality of high-pass filters; and
synthesizes results of integration.

12. The image display device according to claim 11,
wherein the C1, C2, . . . , and Cm include a color included in a first group and a color included in a second group having a higher brightness than the color included in the first group, and the sub-pixels with the color included in the second group are arranged at equal intervals in the pixel area.

13. The image display device according to claim 11,
wherein the C1, C2, . . . , and Cm include a color included in a first group and a color included in a second group having a higher brightness than the color included in the first group, and the sub-pixels with the color included in the second group are arranged such that three or more sub-pixels are not sequentially arranged in a diagonal direction in the pixel area.

14. The image display device according to claim 11,
wherein the image processing unit further includes a plurality of low-pass filters which are paired with the respective plurality of high-pass filters, and
wherein, when integrating the weight coefficients, the image processing unit integrates the weight coefficients with outputs from the respective plurality of high-pass filters and outputs from the respective plurality of low-pass filters.

15. The image display device according to claim 11,
wherein m is 4.

16. The image display device according to claim 11,
wherein m is 6.

17. The image display device according to claim 11,
wherein the colors of C1, C2, . . . , and Cm include three primary colors, that is, red, green, and blue.

18. The image display device according to claim 17, wherein the colors of C1, C2, . . . , and Cm further include at least one color of cyan, magenta, yellow, and white.

19. The image display device according to claim 11, further comprising: a liquid crystal panel in which the pixel area is formed.

* * * * *